US008136972B2

(12) United States Patent
Liao

(10) Patent No.: US 8,136,972 B2
(45) Date of Patent: Mar. 20, 2012

(54) ASSEMBLING-TYPE CAR LAMP

(75) Inventor: Ming-Hong Liao, Taipei Hsien (TW)

(73) Assignee: Eiko (Pacific) Ltd., Port Louis (MU)

( * ) Notice: Subject to any disclaimer, the term of this patent is extended or adjusted under 35 U.S.C. 154(b) by 265 days.

(21) Appl. No.: 12/647,326

(22) Filed: Dec. 24, 2009

(65) Prior Publication Data

US 2010/0277936 A1 Nov. 4, 2010

(30) Foreign Application Priority Data

Apr. 30, 2009 (CN) ...................... 2009 2 0150437 U

(51) Int. Cl.
*B60Q 1/00* (2006.01)

(52) U.S. Cl. ......................... 362/548; 362/549; 362/647

(58) Field of Classification Search .................. 362/647, 362/649, 548, 549, 651
See application file for complete search history.

(56) References Cited

U.S. PATENT DOCUMENTS

| | | | | |
|---|---|---|---|---|
| 6,082,883 | A * | 7/2000 | Tatsumi et al. | 362/548 |
| 6,976,776 | B2 * | 12/2005 | Kakidaira et al. | 362/548 |
| 7,264,391 | B2 * | 9/2007 | Kaandorp | 362/649 |
| 2001/0002170 | A1 * | 5/2001 | Sanuki et al. | 362/523 |

* cited by examiner

*Primary Examiner* — Thomas Sember
(74) *Attorney, Agent, or Firm* — CKC & Partners Co., Ltd.

(57) ABSTRACT

An assembling-type car lamp includes a lamp housing and a bulb unit. The lamp housing is provided with an assembling hole, and the assembling hole is provided on an inner wall surface thereof with a plurality of circumferentially spaced ribs to thereby define a notch between any two adjacent ribs. The bulb unit includes a base and a bulb mounted to the base. The base includes an end plate and a forward raised seat. The raised seat is provided on an outer wall surface thereof with a plurality of circumferentially spaced guide blocks located corresponding to the notches, such that an annular space is defined between the end plate and the guide blocks. The bulb unit can be removably assembled to the lamp housing by moving the guide blocks through the notches into the assembling hole and turning the bulb unit for the ribs to locate in the annular space.

2 Claims, 6 Drawing Sheets

ASSEMBLING-TYPE CAR LAMP

RELATED APPLICATIONS

This application claims priority to Chinese Application Serial Number 200920150437.8, filed Apr. 30, 2009, which is herein incorporated by reference.

FIELD OF THE INVENTION

The present invention relates to a car lamp structure, and more particularly to an assembling-type car lamp.

BACKGROUND OF THE INVENTION

A conventional car lamp structure, as shown in FIG. 1, includes a bulb portion 300 and a lamp housing 400 that are integrally formed through sinter molding, such as a sinter-molded glass lamp housing, with two electric pins 310 of the bulb portion 300 projected from the lamp housing 400. Each of the electric pins 310 has a connecting strip 320 welded thereto for connecting with external wires (not shown).

The conventional integrally formed car lamp structure has the following disadvantages in terms of its manufacture and use: (1) it is troublesome and inconvenient to integrally form the bulb portion 300 and the lamp housing 400 by way of sinter-molding; that is, the bulb portion 300 must be manufactured first, and then the lamp housing 400 and the bulb portion 300 are sintered together; the bulb portion 300 and the lamp housing 400 could not be independently mass-produced and then assembled to each other in a simple manner; and (2) the bulb portion 300 is not replaceable independently; that is, in the event the bulb portion 300 is damaged in the process of manufacturing or burned out while being used, the whole car lamp structure including the lamp housing 400 and the bulb portion 300 must be discarded at the same time to cause waste in material and cost.

It is therefore desirable to develop an improved assembling-type car lamp to overcome the disadvantages in the conventional integrally formed car lamp structure.

SUMMARY OF THE INVENTION

A primary object of the present invention is to provide an assembling-type car lamp that can be easily assembled from independently manufactured lamp housing and bulb unit, and allows convenient replacement of a burned-out bulb unit without the need of discarding the whole car lamp.

To achieve the above and other objects, the assembling-type car lamp according to an embodiment of the present invention includes a lamp housing and a bulb unit. The lamp housing is provided with an assembling hole, and the assembling hole is provided on an inner wall surface thereof with a plurality of circumferentially extended and spaced ribs to thereby define a notch between any two adjacent ribs. The bulb unit includes a base and a bulb mounted to the base. The base includes an end plate and a forward raised seat connected to the end plate. The raised seat is provided on an outer wall surface thereof with a plurality of circumferentially spaced guide blocks located corresponding to the notches, such that an annular space is defined between the end plate and the guide blocks. The bulb unit can be removably assembled to the lamp housing by moving the guide blocks through the notches into the assembling hole and then turning the bulb unit for the ribs on the lamp housing to locate in the annular space.

Further, the ribs are respectively provided at the same end with a sideward stop lug oriented to a front side of the lamp housing. When the bulb unit is turned in the assembling hole and the guide blocks are stopped by the stop lugs from moving any further, the ribs on the lamp housing can be exactly located in the annular space on the bulb unit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
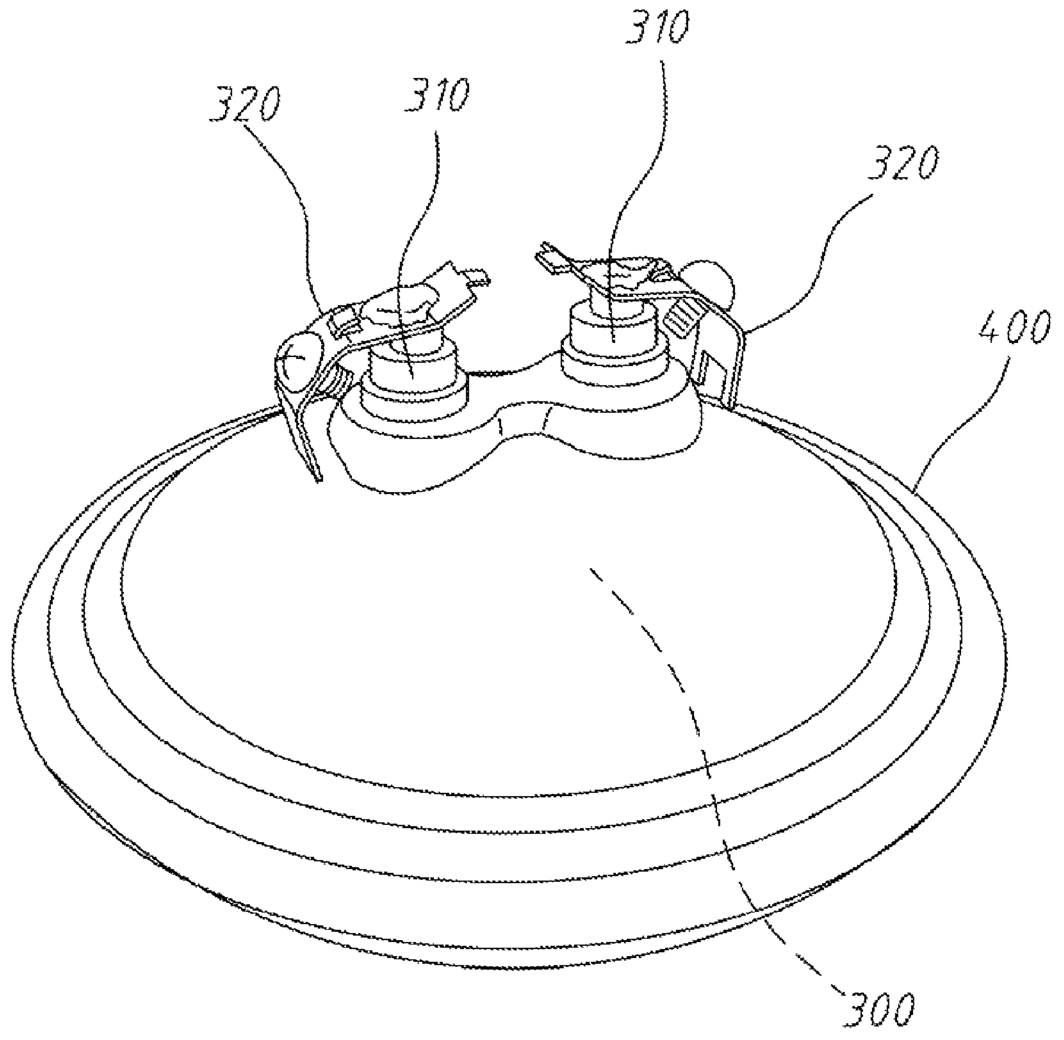
Fig. 1 (Prior Art)
FIG. 1 is a perspective view showing a conventional car lamp structure.
Figure 2:
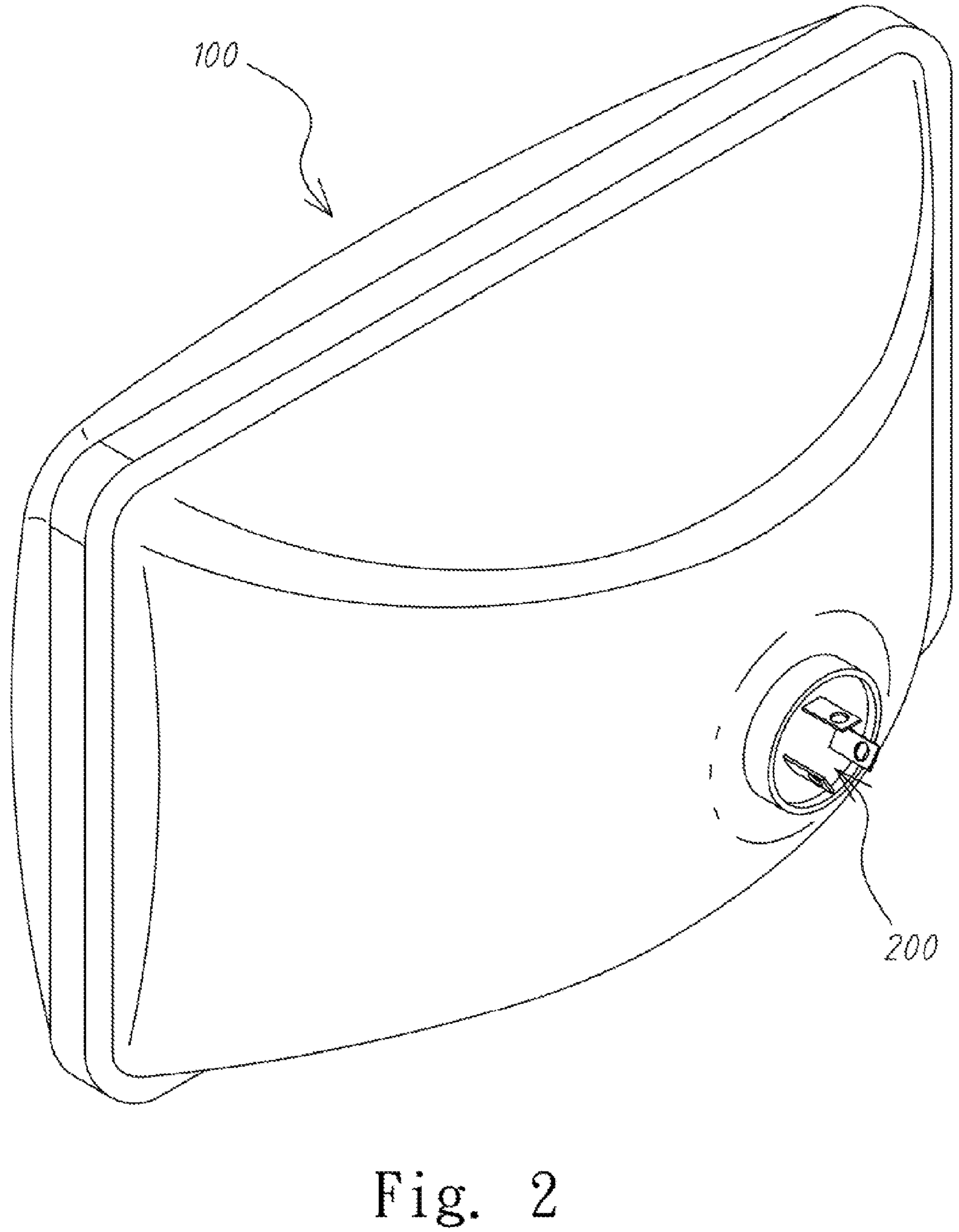
FIG. 2 is an assembled rear perspective view of an assembling-type car lamp according to an embodiment of the present invention.
Figure 3:
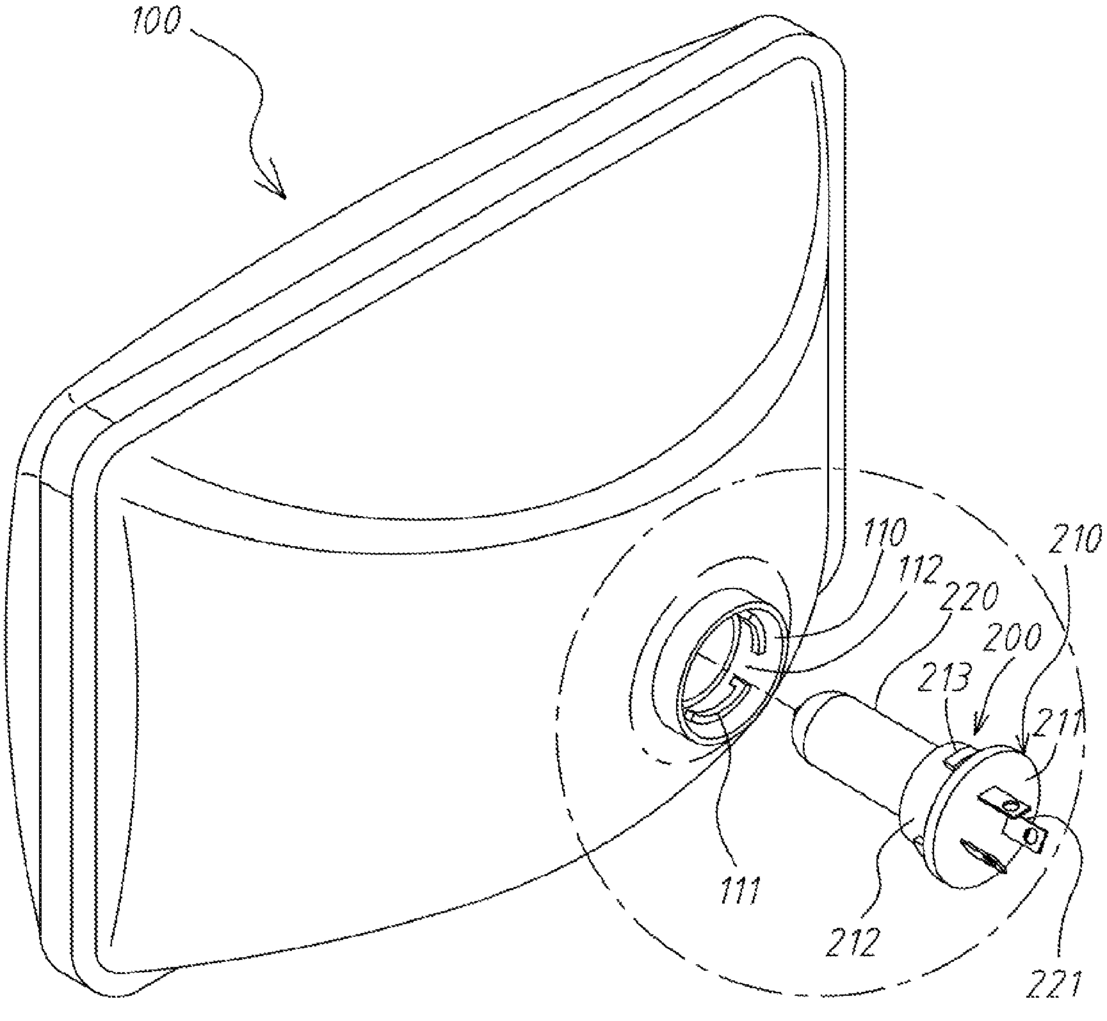
FIG. 3 is an exploded view of FIG. 2.
Figure 4:
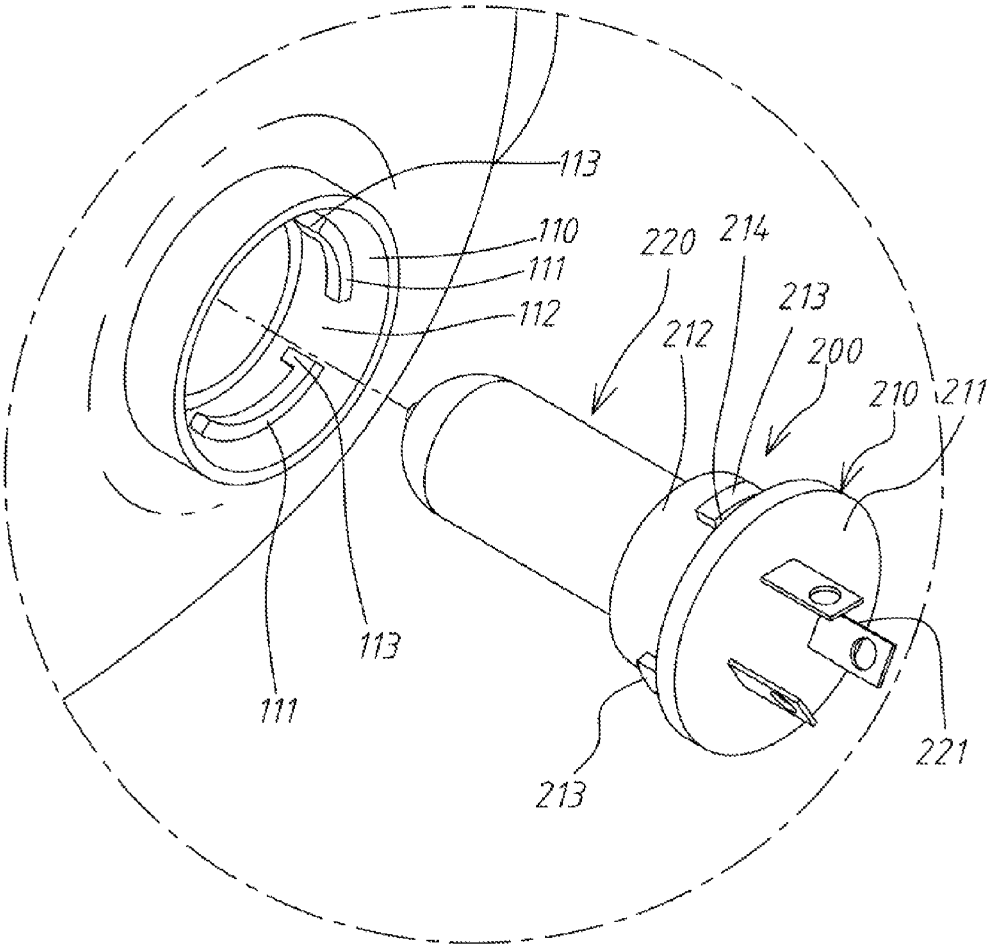
FIG. 4 is an enlarged view of the circled area of FIG. 3.
Figure 5:
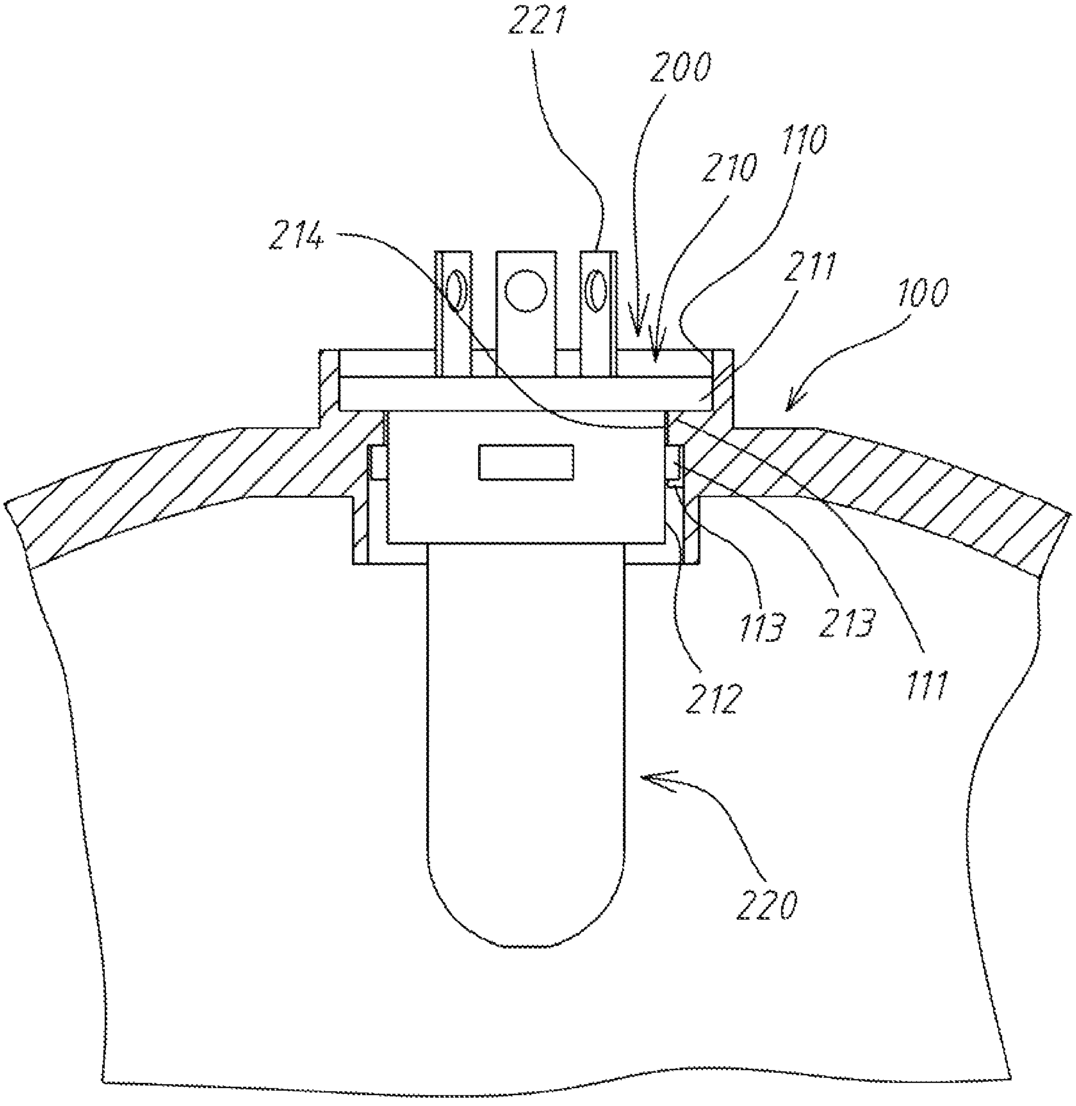
FIG. 5 is a fragmentary assembled sectional view of the assembling-type car lamp of FIG. 2.

FIGS. 2 and 3 are assembled and exploded rear perspective views, respectively, of an assembling-type car lamp according to an embodiment of the present invention, FIG. 4 is an enlarged view of the circled area of FIG. 3, and FIG. 5 is a fragmentary assembled sectional view of the assembling-type car lamp of FIG. 2. As shown, the assembling-type car lamp in the illustrated embodiment includes a lamp housing 100 and a bulb unit 200.

The lamp housing 100 can be made of, for example, a plastic material by molding, and has a reflecting layer (not shown) coated on a front wall surface thereof. Further, the lamp housing 100 is provided at a rear end portion with an assembling hole 110, to which the bulb unit 200 is assembled.

A plurality of ribs 111 are circumferentially extended and spaced along an inner wall surface of the assembling hole 110, such that a notch 112 is formed between any two adjacent ribs 111. The ribs are respectively provided at the same end with a sideward extended stop lug 113 oriented toward a front side of the lamp housing 100.

The bulb unit 200 includes a base 210 and a bulb 220. The base 210 includes an end plate 211 and a forward raised seat 212 connected to the end plate 211. The raised seat 212 is provided on an outer wall surface thereof with a plurality of circumferentially spaced guide blocks 213 located corresponding to the notches 112 in the assembling hole 111, such that an annular space 214 is defined between the guide blocks 213 and the end plate 211. The bulb 220 is mounted to the base 210 and has a plurality of electric pins 221 rearward projected from the end plate 211 for connecting with external wires (not shown).

Figure 6:
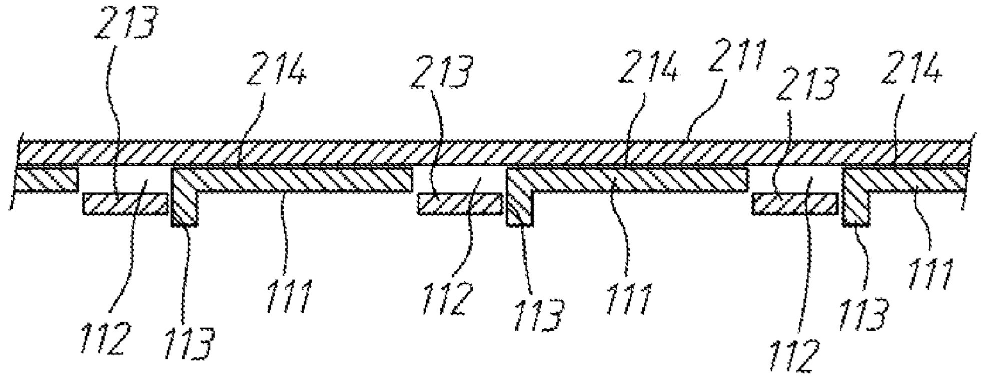
FIGS. 6 and 7 are fragmentary sectioned developed views of the assembling-type car lamp of FIG. 2 showing the manner of assembling a bulb unit and a lamp housing of the car lamp to each other.
Figure 7:
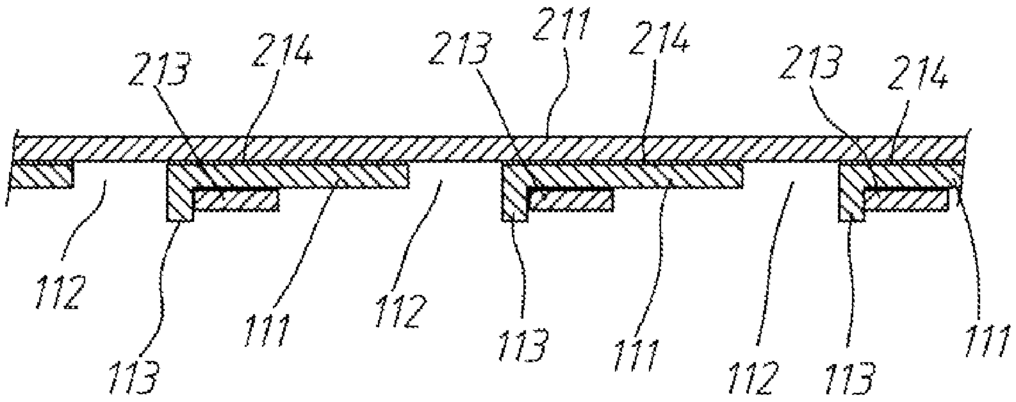

FIGS. 6 and 7 are fragmentary sectioned developed views of the assembling-type car lamp of FIG. 2. To assemble the bulb unit 200 to the lamp housing 100, simply align the guide blocks 213 of the bulb unit 200 with the notches 112 on the lamp housing 100 and move the bulb unit 200 through the assembling hole 110, as shown in FIG. 6, and turn the bulb unit 200 for the ribs 111 on the lamp housing 100 to move into the annular space 214 between the end plate 211 and the guide blocks 213. Then, the bulb unit 200 is further turned until the guide blocks 213 are abutted on the stop lugs 113, as shown in FIG. 7. At this point, the bulb unit 200 is exactly assembled to the lamp housing 100. When it is desired to remove the bulb unit 200 from the lamp housing 100 or replace the bulb unit 200 with another one, simply turn the bulb unit 200 reversely to separate the bulb unit 200 from the lamp housing 100.

With the arrangements, the lamp housing and the bulb unit can be independently manufactured and then be easily assembled together for use. In the event of having a burned-out bulb, only the bulb unit is replaced without the need of discarding the whole car lamp. Therefore, the assembling-type car lamp of the present invention is convenient, economical and practical for use.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An assembling-type car lamp, comprising:

a lamp housing being provided at a predetermined position with an assembling hole, the assembling hole being provided on an inner wall surface thereof with a plurality of circumferentially extended and spaced ribs, such that a notch is formed between any two adjacent ones of the ribs; and a bulb unit including a base and a bulb mounted to the base; the base including an end plate and a forward raised seat; the bulb including a plurality of electric pins rearward projected from the end plate to connect to external wires; the raised seat being provided on an outer wall surface thereof with a plurality of guide blocks located corresponding to the ribs in the assembling hole of the lamp housing, such that an annular space is defined between the guide blocks and the end plate for slidably receiving the ribs of the lamp housing therein.

2. The assembling-type car lamp as claimed in claim 1, wherein the ribs are respectively provided at the same end with a sideward extended stop lug oriented toward a front side of the lamp housing.

* * * * *